(No Model.)

J. A. LAWRENCE.
BAND STRETCHER.

No. 336,571. Patented Feb. 23, 1886.

Witnesses:
N. E. Burgek,
H. N. Truck.

Inventor.
Joseph A. Lawrence.
Per Z. P. Dederick.
Attorney.

UNITED STATES PATENT OFFICE.

JOSEPH A. LAWRENCE, OF SHERMAN, TEXAS.

BAND-STRETCHER.

SPECIFICATION forming part of Letters Patent No. 336,571, dated February 23, 1886.

Application filed July 25, 1885. Serial No. 172,698. (No model.)

*To all whom it may concern:*

Be it known that I, JOSEPH A. LAWRENCE, a citizen of the United States, residing at Sherman, in the county of Grayson and State of Texas, have invented certain new and useful Improvements in Band-Stretchers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in band-stretchers in which a windlass, crank, and ratchets operate in conjunction with a sliding clamp; and the object of my improvement is to provide a device with which the ends of a band may be drawn together and held for the purpose of lacing. I attain this object by the mechanism illustrated in the accompanying drawings, in which—

Figure 1:
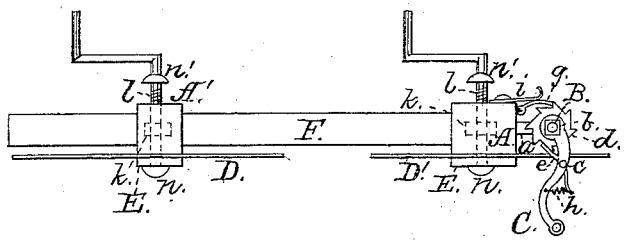
Figure 2:
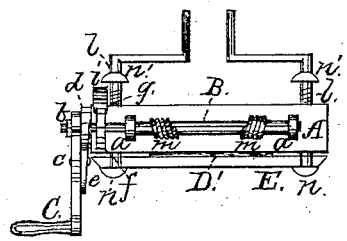
Figure 3:
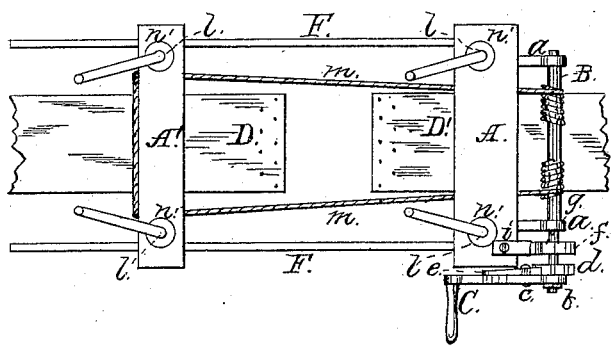
Figure 4:
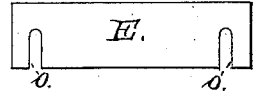

Figure 1 is a side view of the entire device; Fig. 2, a front view of the same; Fig. 3 a top view, and Fig. 4 a detailed view, of one of the clamping-bars.

To the clamping-block A are secured bearings *a a*, in which the windlass-shaft B turns. Turning loosely on one end of this shaft is a crank, C, held in place by nut *b*, and to said crank is pivoted, at *c*, a pawl, *e*, that, as the crank is turned, engages the notches in the ratchet *d*, that is keyed to the shaft, which obviates the necessity of turning the crank entirely around in order to draw the two ends of the band together. The ratchet *f*, also secured to shaft B, together with pawl *g*, prevents the shaft from turning back as the motion of the crank is reversed for another forward stroke. The springs *h* and *i*, connected with the pawls *e* and *g*, insure their engaging with the notches of the ratchets as the same are turned.

The two ends of the rope *m* are secured to shaft B, and it passes back through holes in block A', and as the crank is turned the ends of the rope are wound around it, thus drawing the block A', to which one end of the band D is clamped, forward until it meets the other end, clamped in block A, where they are held while being laced. In mortises in the blocks A A' are nuts *k*, and passing through them and the blocks A A' are bolts *l*, provided with cranks, as shown, and upon the end of each are riveted washers *n*, that draw the clamping-blocks E E firmly against the band D.

In some cases it is more convenient to clamp the band on top of the blocks A A', instead of on the under side, as shown. For this purpose the washers *n'*, also secured to the bolts *l*, are provided.

The clamp-plates E E (clearly shown in Fig. 4) are provided with slots *o o*, enabling them to be detached from the bolts *l* as soon as the pressure is released, and as quickly placed on top of blocks A A', for clamping in that position.

In practice the operation is as follows: Near the end and upon the top side of a band to be laced is placed the block A', when the clamp-plate is placed under it and over the washers *n n*, when the cranks attached to the bolts are turned, securely gripping the band between the plate E and block A'. The ends of the band are then drawn together as tightly as possible by hand, when the other end is clamped between block A and plate. The crank C then being turned draws the block A' forward along guides F F until the ends of the band meet, when the lacing may be done, after which, the bolts *l* being given a few turns in an opposite direction, the plates E are released, and the stretcher may be removed.

Having thus described my invention, what I claim as new, and desire to secure by Letters Patent, is—

1. The combination, in a band-stretcher, of a sliding block, A', provided with clamping-plate E, and crank-bolts *l l*, with the guides F F and clamping-block A, all substantially as set forth.

2. In a band-stretcher, the windlass-shaft B, provided with ratchets *d* and *f*, and loose crank C, carrying pawl *e*, said shaft turning in bearings in clamping-block A, in combination with the rope *n* and sliding block A', substantially as described.

In testimony whereof I affix my signature in presence of two witnesses.

JOSEPH A. LAWRENCE.

Witnesses:
W. E. BURGESS,
H. N. TUCK.